(12) United States Patent
Sharrow et al.

(10) Patent No.: US 7,933,080 B1
(45) Date of Patent: Apr. 26, 2011

(54) MULTI-AXIS OPTICAL MOUNT

(75) Inventors: Joseph F. Sharrow, Fredericksburg, VA (US); Christopher P. Behre, Jr., King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 148 days.

(21) Appl. No.: 12/460,177

(22) Filed: Jul. 8, 2009

(51) Int. Cl.
*G02B 7/02* (2006.01)
(52) U.S. Cl. ........................................ 359/819; 359/827
(58) Field of Classification Search .................. 359/819, 359/827
See application file for complete search history.

(56) References Cited

U.S. PATENT DOCUMENTS

| | | | | |
|---|---|---|---|---|
| 4,081,812 A * | 3/1978 | Flother | ........................ | 396/529 |
| 5,313,333 A | 5/1994 | O'Brien et al. | ............... | 352/820 |
| 5,638,169 A | 6/1997 | Hollmann et al. | ............ | 356/127 |
| 6,297,917 B1 * | 10/2001 | Burr | .............................. | 359/825 |
| 6,754,013 B2 | 6/2004 | Willis | .......................... | 359/819 |

* cited by examiner

*Primary Examiner* — Ricky L Mack
*Assistant Examiner* — James C Jones
(74) *Attorney, Agent, or Firm* — Gerhard W. Thielamn, Esq.

(57) ABSTRACT

A mounting mechanism is provided for aligning and securing an optical instrument to a platform. The mechanism includes a housing, a trunnion and a base-plate. The housing receives the optical instrument along a longitudinal axis. The housing includes an attach support for the optical instrument, and an interface having vertically-facing cylindrical-fastener orifices. The trunnion supports the housing at the interface. The trunnion has pluralities of vertical slots and horizontal slots. Each vertical slot overlaps a corresponding vertical orifice. The vertical slots provide elevation displacement to vertically translate and pitch the housing. The horizontal slots provide lateral displacement to horizontally translate and yaw the housing. The base-plate supports the trunnion and is mountable onto the platform. The base-plate has a plurality of horizontally-facing cylindrical-fastener orifices. Each horizontal slot on the trunnion overlaps a corresponding horizontal orifice on the base-plate. Each orifice of the vertically- and horizontally-facing orifices receives a cylindrical-fastener that passes through a counterpart slot of the vertical and horizontal slots. Each cylindrical fastener for each orifice corresponds to a helical screw.

10 Claims, 15 Drawing Sheets

MULTI-AXIS OPTICAL MOUNT

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to devices for securely mounting and aligning precision optical components. In particular, such mounts are intended to provide precise alignment in multiple axes for instruments, such as a fiber laser collimator.

Optical devices employ mounting mechanisms to provide alignment relative to a platform to be oriented with respect to line-of-sight. Such devices are designed to adjust for pitch, yaw and roll pivoting, as well as lateral and vertical translation.

Precision optical systems require mounting and adjusting of multiple components along the optical path to accomplish a given task. Four (4) adjustments commonly required include tip-tilt and translation in two (2) axes at either end. These adjustments are typically performed by two separate mounts and actuators, one for tip-tilt and one for both translations.

SUMMARY

Conventional optical mounts yield disadvantages addressed by various exemplary embodiments of the present invention. In particular, various exemplary embodiments provide a mount with overlapping orifices on either the base-plate or the housing for an optical element and slots on the intervening cradle to receive fasteners that enable horizontal and vertical adjustment.

Various exemplary embodiments provide a mounting mechanism for aligning and securing an optical instrument to a platform. The mechanism includes a housing, a trunnion (or cradle) and a base-plate. The housing receives the optical instrument along a longitudinal axis. The housing includes an attach support for the optical instrument, and an interface having vertically-facing cylindrical-fastener orifices.

The trunnion supports the housing at the interface. The trunnion has pluralities of vertical slots and horizontal slots. Each vertical slot overlaps a corresponding vertical orifice. The vertical slots provide elevation displacement to vertically translate the housing. The horizontal slots provide lateral displacement to horizontally translate the housing.

The base-plate supports the trunnion and is mountable onto the platform. The base-plate has a plurality of horizontally-facing cylindrical-fastener orifices. Each horizontal slot on the trunnion overlaps a corresponding horizontal orifice on the base-plate. Each orifice of the vertically- and horizontally-facing orifices receives a cylindrical-fastener that passes through a counterpart slot of the vertical and horizontal slots. Each cylindrical fastener for each orifice corresponds to a helical screw The housing and trunnion can include parallel and overlapping ledges to enable jack-screws to pass therethrough to inhibit wobble. In various exemplary embodiments, the housing is unitary. In alternate embodiments, the housing comprises several interfacing components.

BRIEF DESCRIPTION OF THE DRAWINGS

These and various other features and aspects of various exemplary embodiments will be readily understood with reference to, the following detailed description taken in conjunction with the accompanying drawings, in which like or similar numbers are used throughout, and in which.

DETAILED DESCRIPTION

Figure 1:
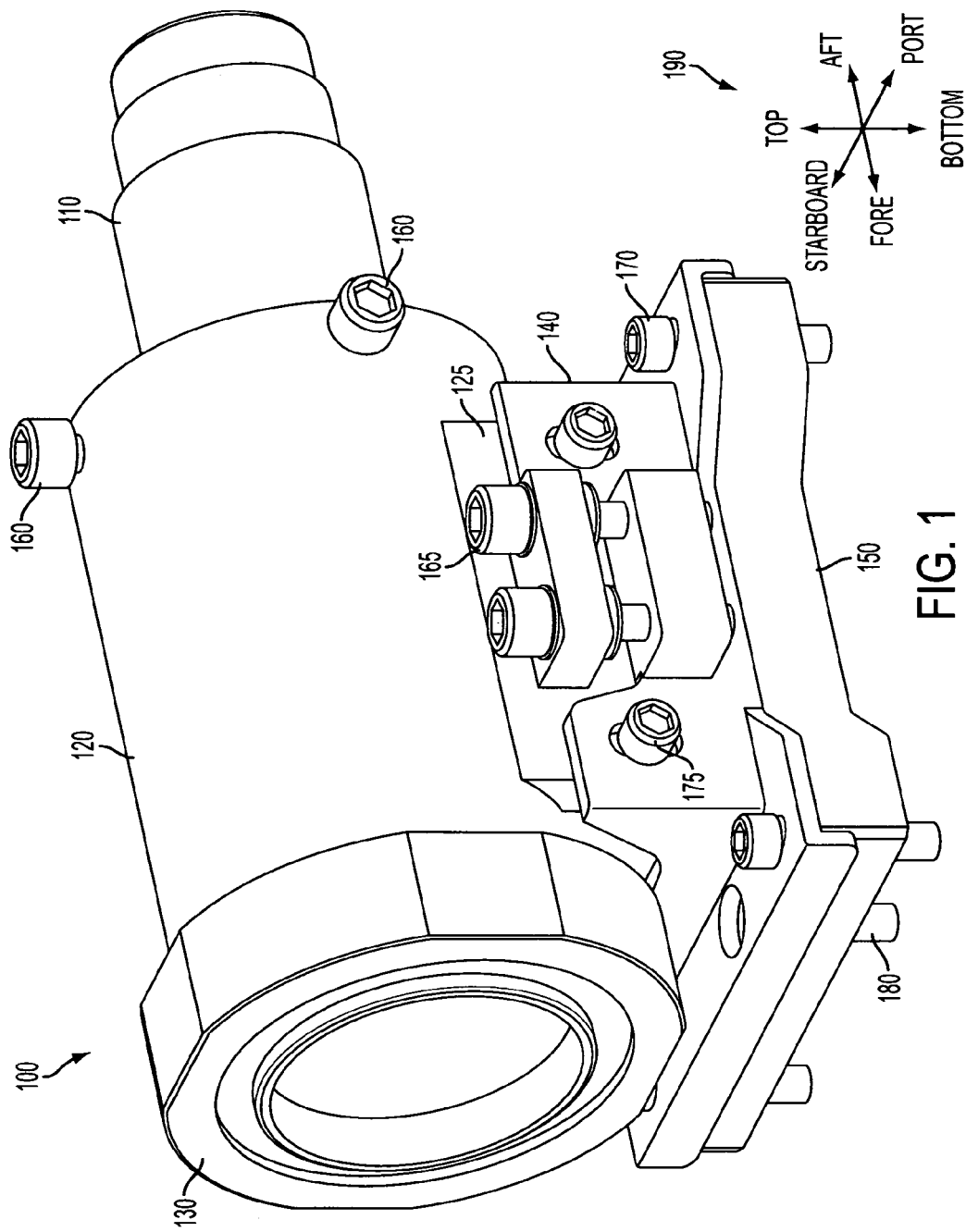
FIG. 1 is a first perspective assembly view of an optical mount for a first embodiment.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Conventional actuators can be unwieldably large and do not usually permit the researcher to lock them securely once the desired adjustment has been made, being laboratory devices. These devices occupy a much greater volume (roughly double) for the same number of axes than provided by various exemplary embodiments. Additionally, conventional methods typically incorporate active drive in only a single direction of an axis, while relying on springs to maintain preload and restrict motion in the opposite direction. This results in a device having stability only in the confines of a laboratory, and therefore not being sufficiently rugged to be suitable for field or military use.

Various exemplary embodiments consist of three major components:

First, a main housing that mounts the optical component, such as a fiber laser collimator shown in the drawings. The housing contains a spherical plastic bearing at one end, and multiple setscrews at the other. By driving opposing screws in opposite directions, the optical device rotates about the spherical bearing, providing tip-tilt motion.

Second, a trunnion that supports the main housing. This mates with the main housing and base-plate and provides vertical translation of the main housing and optical component relative to the trunnion. It incorporates multiple very fine pitch jack-screws (80-threads/inch) and lock-screws which drive and subsequently lock vertical motion between the trunnion and main housing.

Third, a base-plate that supports the trunnion. This provides horizontal translation of the trunnion, main housing, and optical device relative to the baseplate. It incorporates one very fine pitch jack screw (80 threads/inch) and lock screws which drive and lock horizontal motion between the base-plate and trunnion.

The incorporation of multiple axes of adjustment in a small volume represents a particular advantage of the exemplary embodiments. Conventional means usually require at least two separate devices to accomplish the same task. In particular, conventional devices separately employ a first mechanical stage to perform tip-tilt adjustment and a second mechanical stage to perform horizontal translation. Each of the two separate devices usually require approximately the volume used in these embodiments to perform both adjustments. Another important advantage and novel capability of these embodiments involves securely locking the device in position after completing the required adjustments.

FIG. 1 shows a first perspective assembly view 100 of a compact rugged multi-axis optical mount in a first embodiment to reveal the port side. The mount assembly holds an optical element 110, such as a fiber laser collimator. A main housing 120 contains the optical element 110 and includes of a cylindrical tube that attaches to an interface bracket 125, shown as an integral unit. A spherical joint tightening ring 130 maintains the optical element 110 at its fore end by clamping a bearing joint described further. A trunnion 140 attaches to the interface 125. A base-plate 150 attaches to the trunnion 140.

The housing 120 adjustably clamps the optical element 110 with four (4) tip-tilt opposing adjustment lock-screws 160 arranged in cruciform pattern at the aft end. In alternative configurations, the housing 120 can be adjustable or replaced with a cylindrical container to receive another device with a different geometry than the optical element 110. The interface 125 and trunnion 140 connect together by three (3) vertical axis jack-screws 165. The trunnion 140 and the base-plate 150 attach at their corresponding corners with four (4) horizontal axis lock-screws 170 mounted vertically.

Four (4) vertical axis lock-screws 175 enable adjustment of tilt alignment between the trunnion 140 and the interface 125 of the housing 120 the four vertical axis lock-screws 175. Two (2) mount screws 180 attach the base-plate 150 to the stationary platform (not shown). The pair of mount screws 180 connects at fore and aft ends of the base-plate 150 to the platform.

A compass rose 190 displays relative orientation axes of the assembly along the longitudinal axis (fore and aft), horizontal lateral axis (port and starboard) and vertical lateral axis (top and bottom). These orthogonal axes further indicate respective roll, pitch and yaw rotation. The optical mount using the lock-screws 170 and 175 can adjustably translate the optical element 110 in two of these: lateral and vertical directions. The lock-screws 160 for this first described embodiment can also incrementally pivot the optical element 110 around these respective axes for limited pitch and yaw adjustment.

Figure 2:
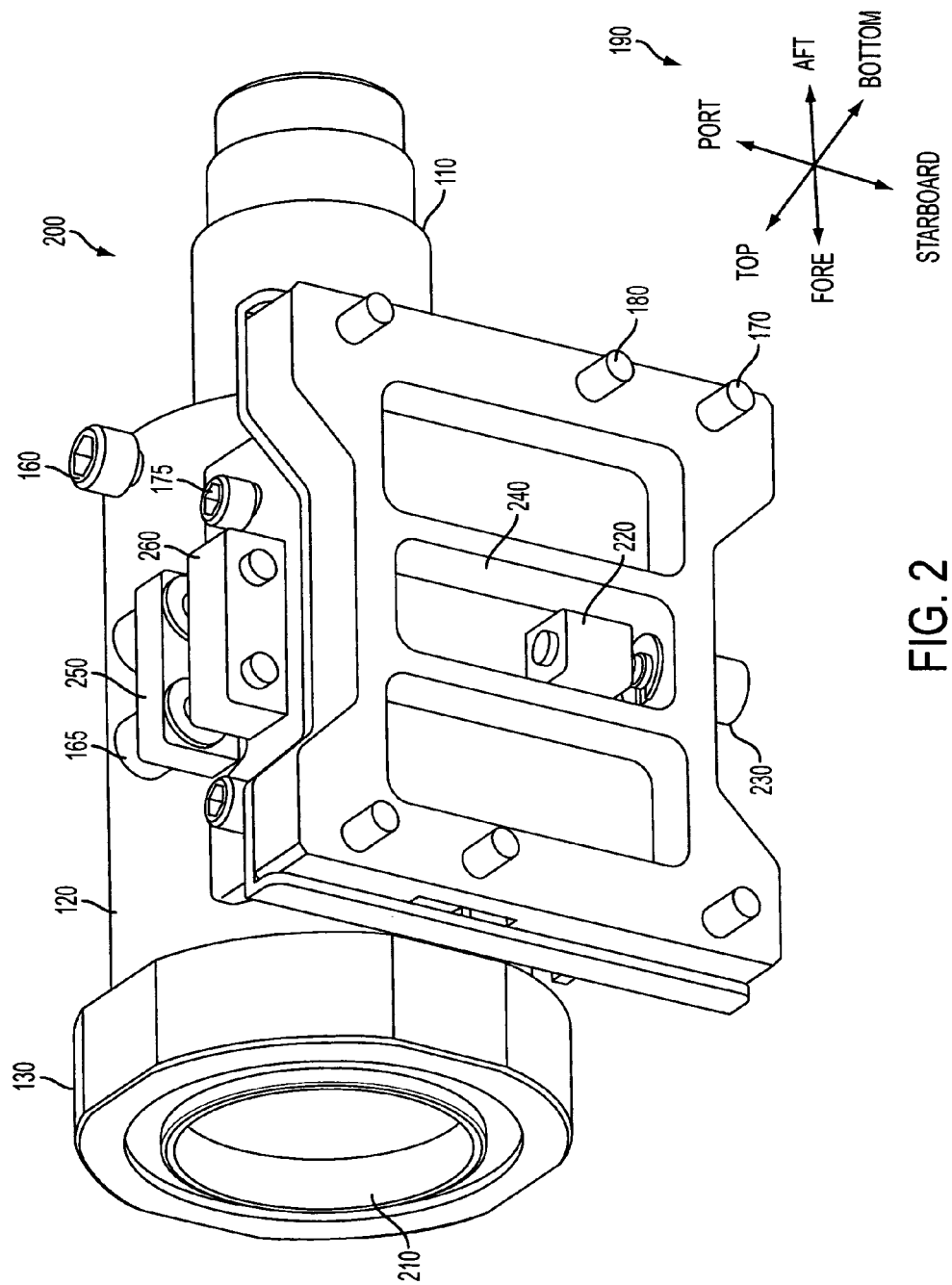
FIG. 2 is a second perspective assembly view of the optical mount.

FIG. 2 shows a second perspective assembly view 200 of the first embodiment from the bottom. The optical element 110 includes a receiving lens 210 at the fore end. A bottom bracket 220 protrudes from the trunnion 140. A horizontal axis adjustment bolt 230 connects the base-plate 150 to that bracket 220, which extends into a through-vertical cavity 240 of the base-plate 150. The interface 125 includes a housing port ledge 250. The trunnion 140 includes a trunnion port ledge 260. Two (2) of the three (3) jackscrews 165 pass through co-axial orifices of the port ledges 250, 260.

Figure 3:
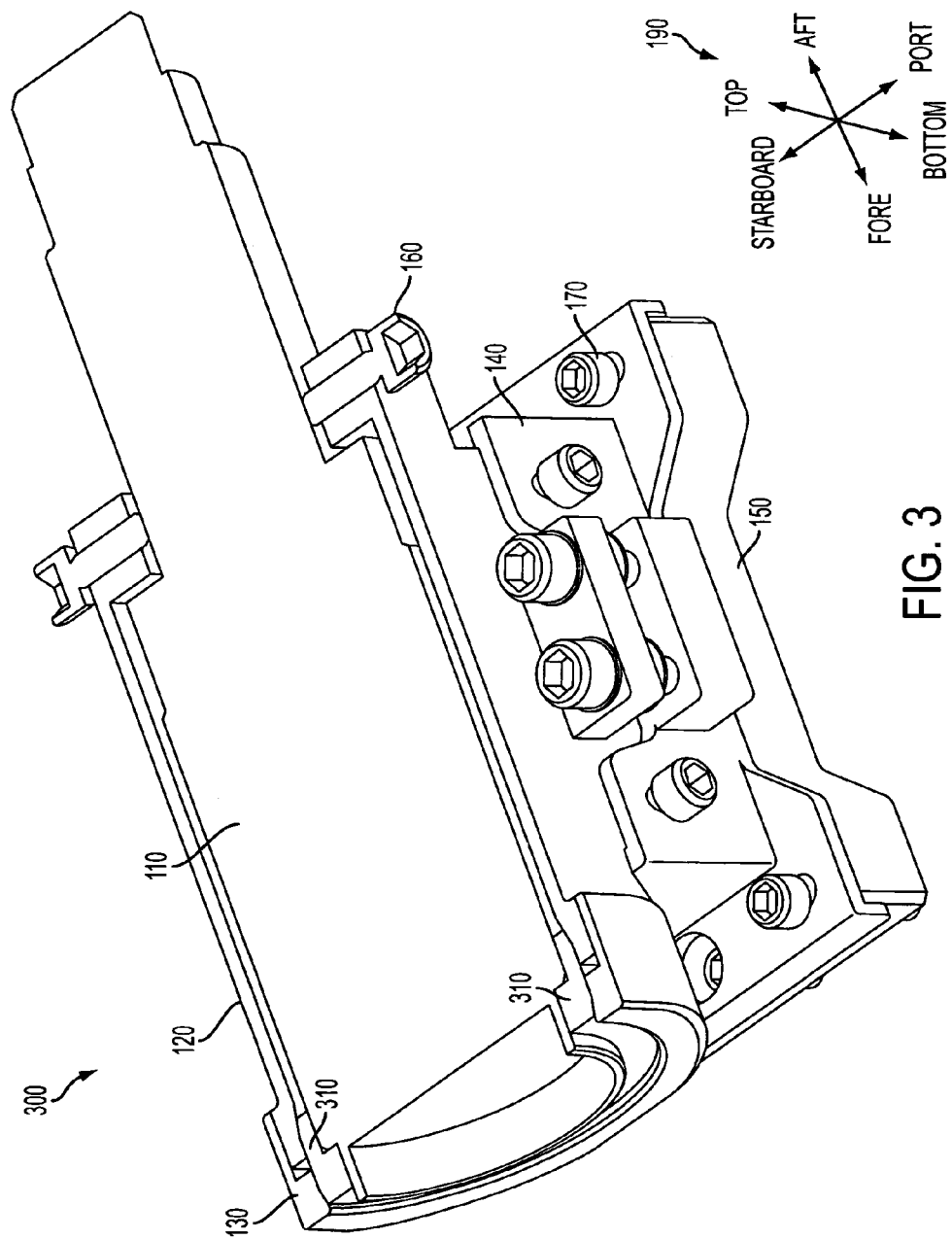
FIG. 3 is a perspective cross-section view of the optical mount.

FIG. 3 shows a perspective cutaway view 300 of the compact rugged multi-axis optical mount. At the assembly fore end, a spherical bearing joint 310 is radially disposed between the receiving lens 210 and the ring 130 (by clamping the joint 310) to provide cantilever support for the optical element 110. The joint 310 extends a tang that radially disposes between the optical element 110 and the housing 120 to secure the optical element 110 at the fore end of the housing 120. The radially inward lock-screws 160 provide counter-support opposite for the optical element 110 at the aft end of the housing 120.

Figure 4:
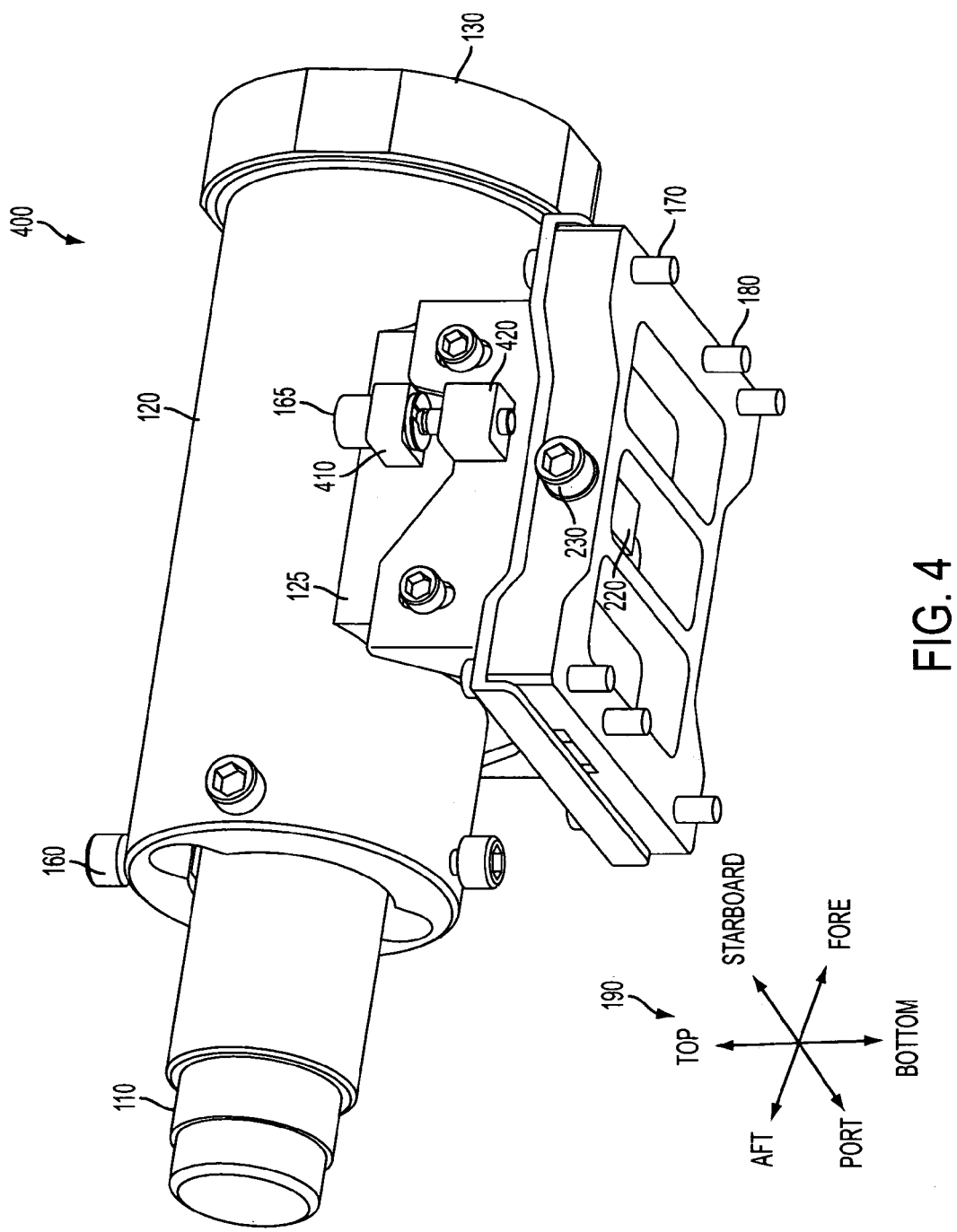
FIG. 4 is a third perspective assembly view of the optical mount.
Figure 5:
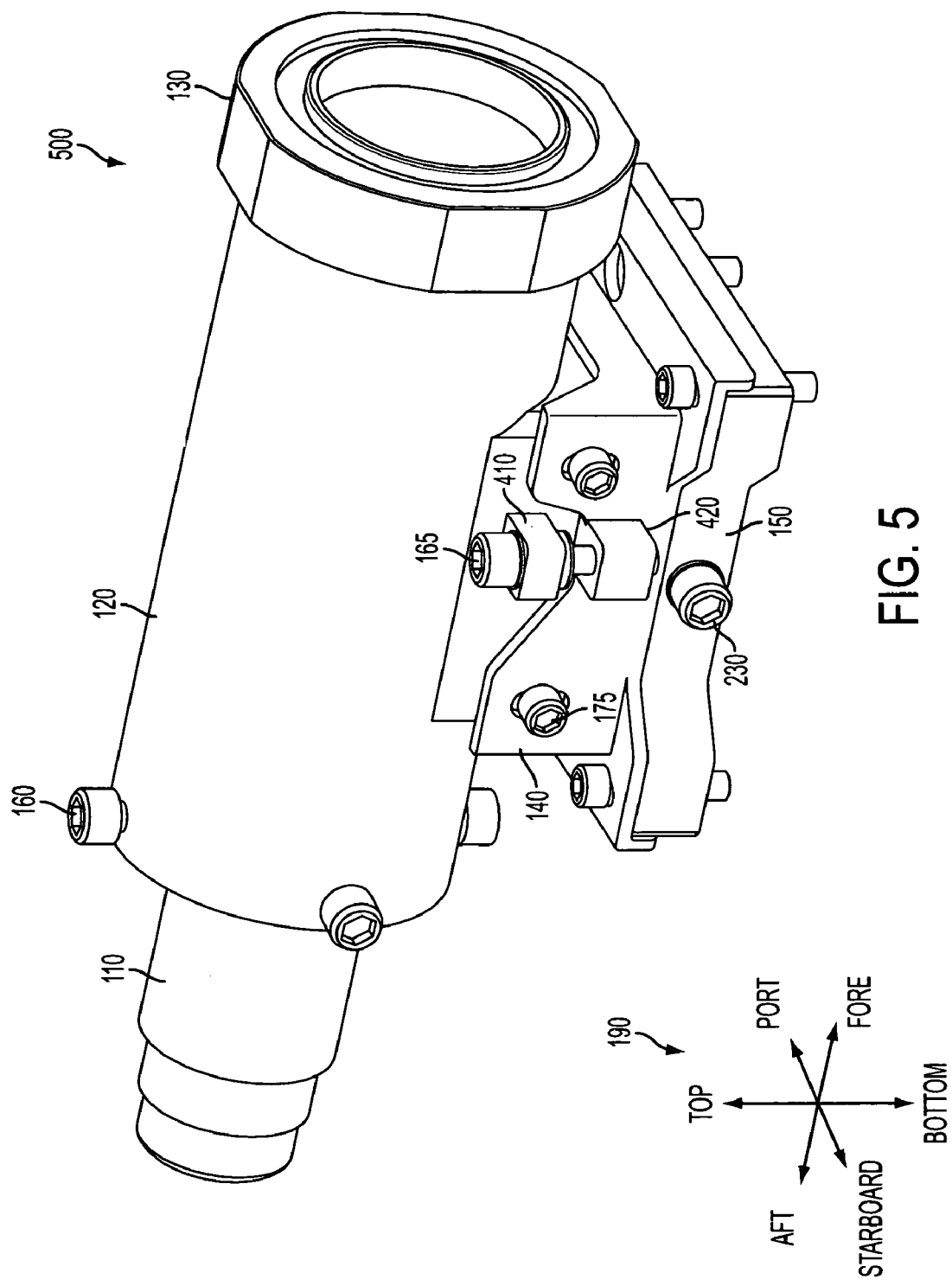
FIG. 5 is a fourth perspective assembly view of the optical mount.
Figure 6:
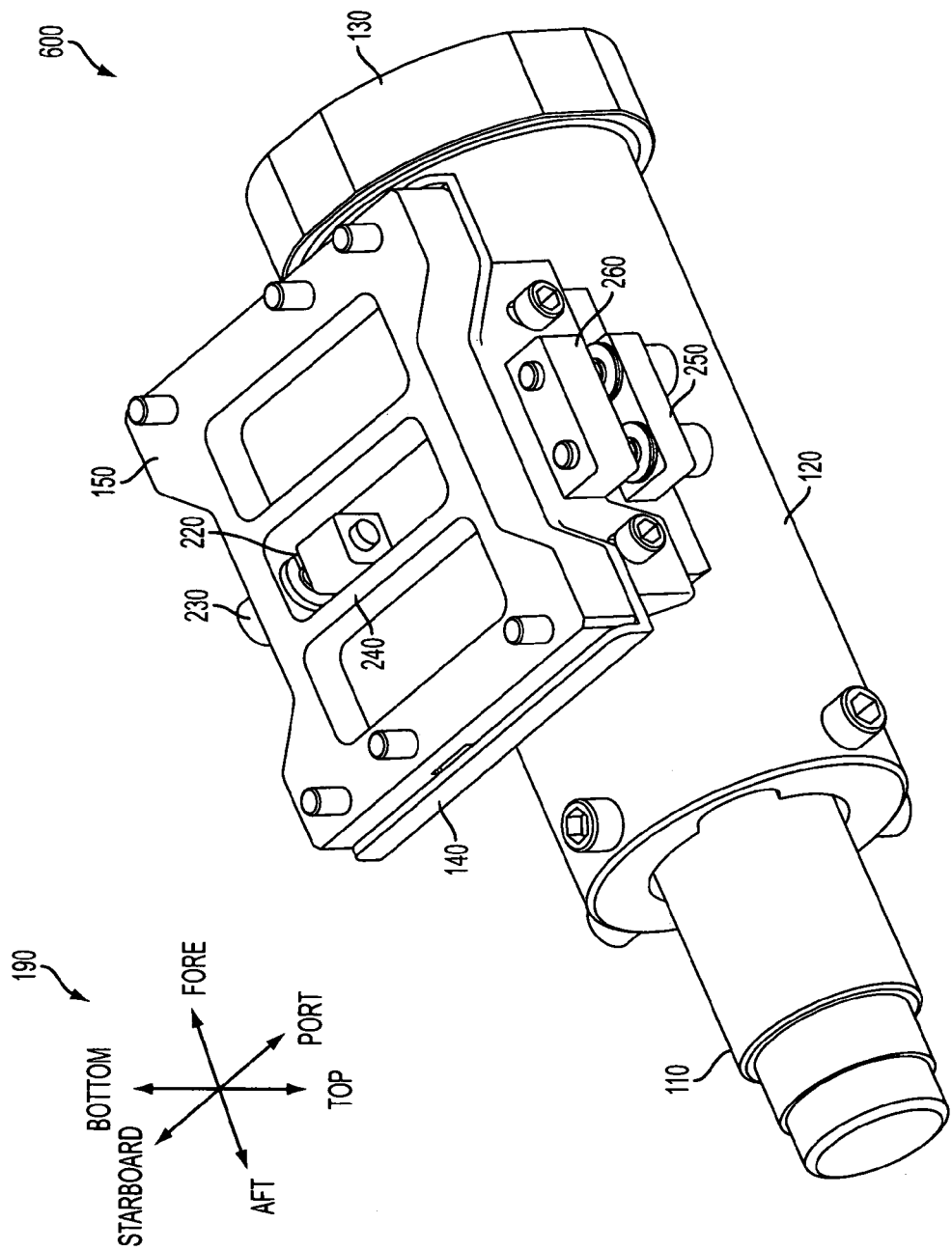
FIG. 6 is a firth perspective assembly view of the optical mount.

FIG. 4 shows a third perspective assembly view 400 of the star-board side. Although the housing 120 and the optical element 110 shown in the view 400 are longer and thinner than their counterparts in view 100, these constitute analogous components throughout. The interface 125 includes a housing starboard ledge 410. The trunnion 140 includes a trunnion starboard ledge 420. One (1) of the three (3) jackscrews 165 pass through co-axial orifices of the starboard ledges 410, 420. FIG. 5 shows a fourth perspective assembly view 500 of the starboard side. FIG. 6 shows a fifth perspective assembly view 600 from the bottom side.

Figure 7:
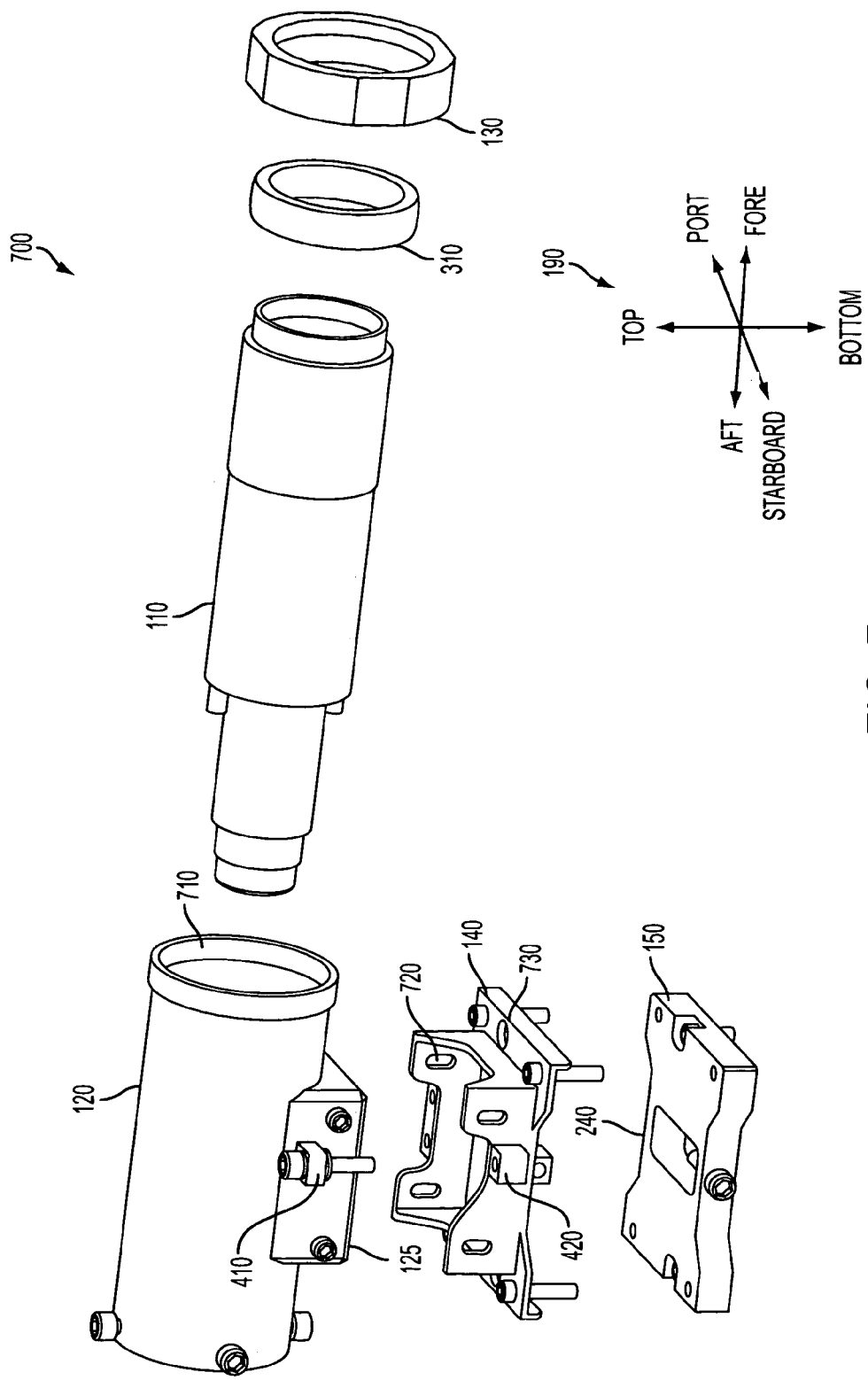
FIG. 7 is a first perspective exploded view of the optical mount.

FIG. 7 shows a first perspective exploded view 700 of components of the compact rugged multi-axis optical mount. The housing 120 includes a forward opening 710 to receive the optical element 110. The trunnion 140 includes vertical plane slot-orifices 720 to receive the lock-screws 175. The trunnion 140 also includes horizontal screw orifices 730 enable the mount screws 180 to pass through to the base-plate 150.

Figure 8:
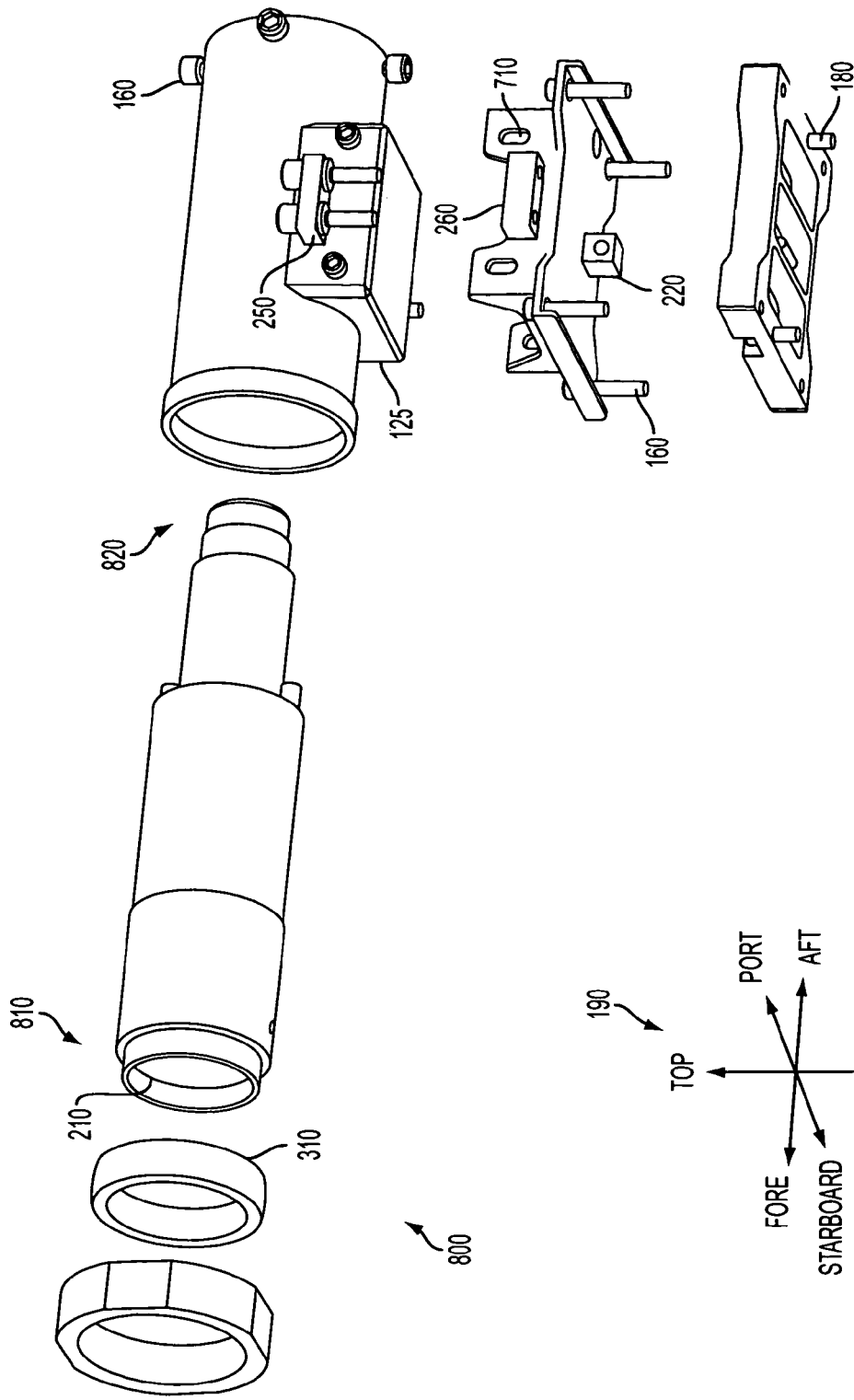
FIG. 8 is a second perspective exploded view of the optical mount.
Figure 9:
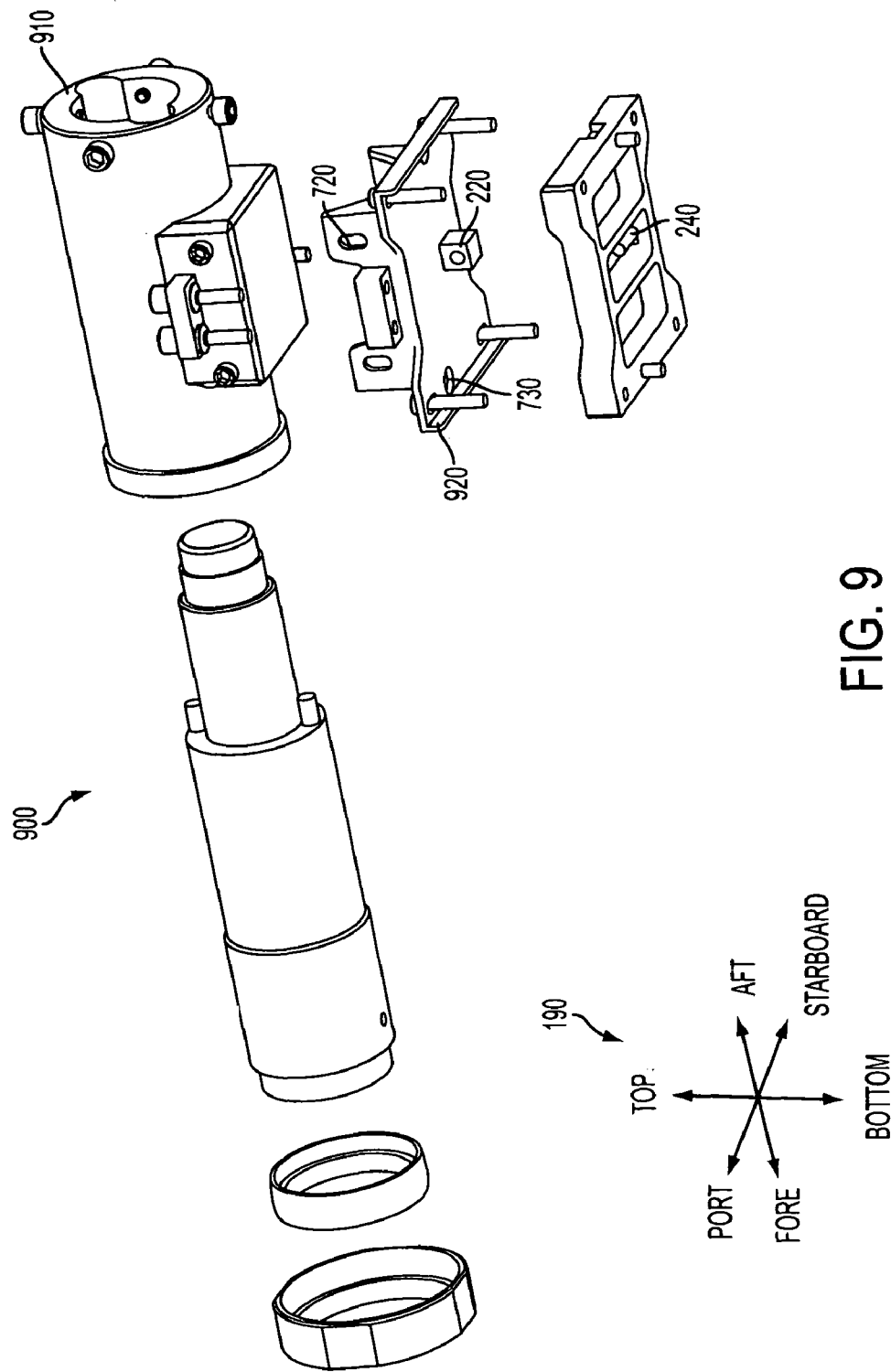
FIG. 9 is a third perspective view exploded of the optical mount.
Figure 10:
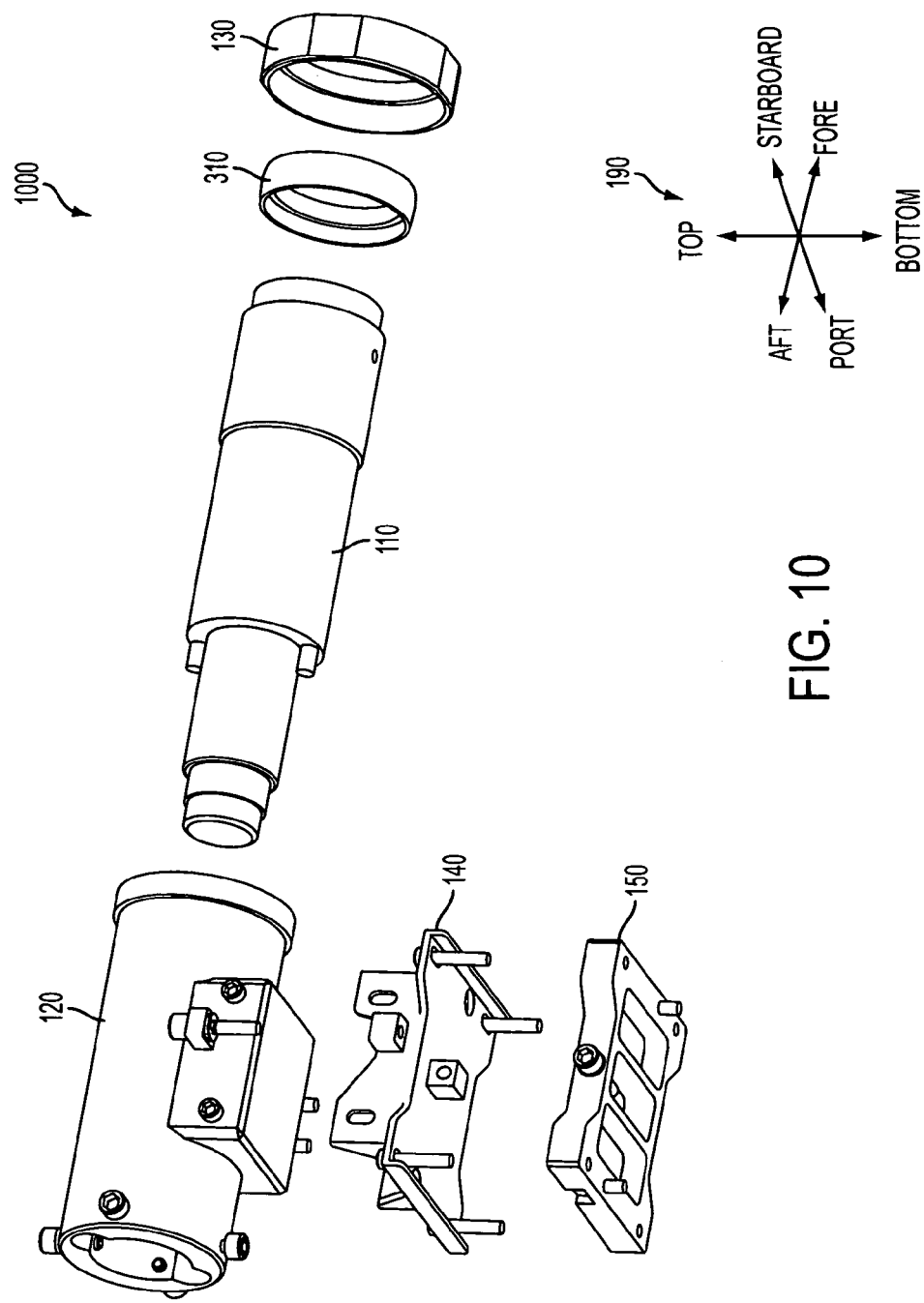
FIG. 10 is a fourth perspective exploded view of the optical mount.

FIGS. 8 and 9 respectively show second and third perspective exploded views 800 and 900. The housing 120 includes an aft opening 910 through which the optical element 110 passes. The trunnion 140 includes horizontal plane slot-orifices 920 to receive the lock-screws 170. FIG. 10 shows a fourth perspective exploded view 1000 illustrating the bottom of the components.

Figure 11C:
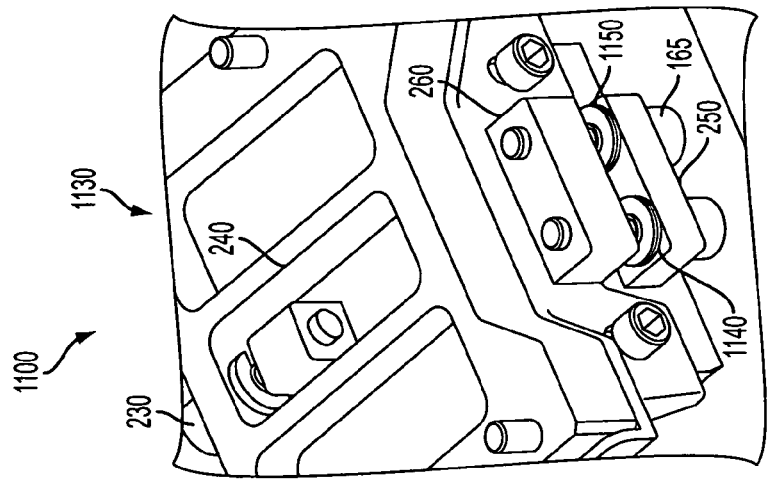
FIG. 11A through 11C are perspective detail views of the optical mount.
Figure 11B:
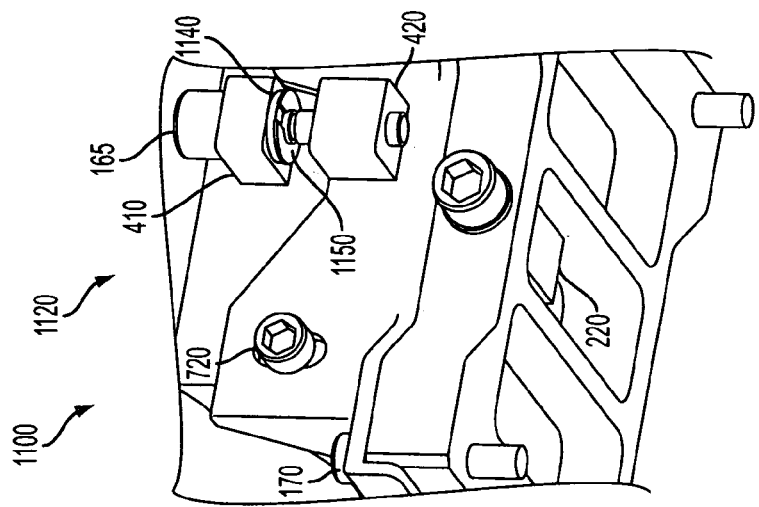
Figure 11A:
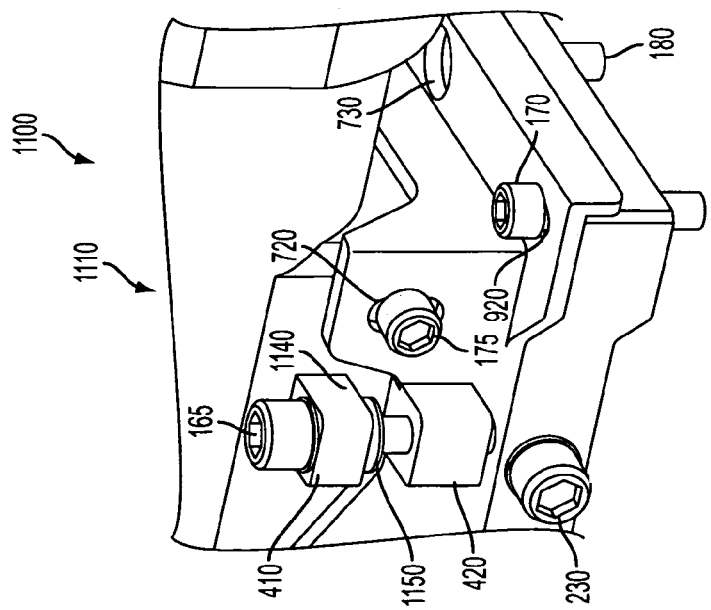

FIGS. 11A, 11B and 11C show perspective detail views 1100 illustrating the particular components related to the bolts 165 and 230. FIG. 11A shows a first detail view 1110 from the fourth perspective view 500. FIG. 11B shows a second detail view 1120 from the third perspective view 400. FIG. 11C shows a third detail view 1130 from the fifth perspective view 600. The slot-orifices 720 on the trunnion 140 permit vertical translation of the interface 125 and/or pivotable adjustment in pitch rotation. The slot-orifices 920 on the trunnion 140 permit its lateral translation along the base-plate 150. The lock-screws 170 secure the trunnion 140 vertically to the base-plate 150; the adjustment bolt 230 secures the trunnion 140 laterally to the base-plate 150. The mount screws 180 secure the base-plate 150 to the stationary platform.

Pre-load tension applies to bolts 165 and 230 by a spring 1140 held in position by an e-clip 1150. The spring 1140 typically represents a washer with radially concave curvature. The e-clip 1150 constitutes an open circular flat fastener. To impose the pre-load, the spring 1140 and e-clip 1150 are disposed, for example, between the head of the bolt 165 and the ledges 250, 410. The combined triplet of bolts 165 anchors the interface 125 of the housing 120 (without rocking) by the ledges 250 and 410 to their counterpart ledges 260 and 420 of the trunnion 140.

Figure 12:
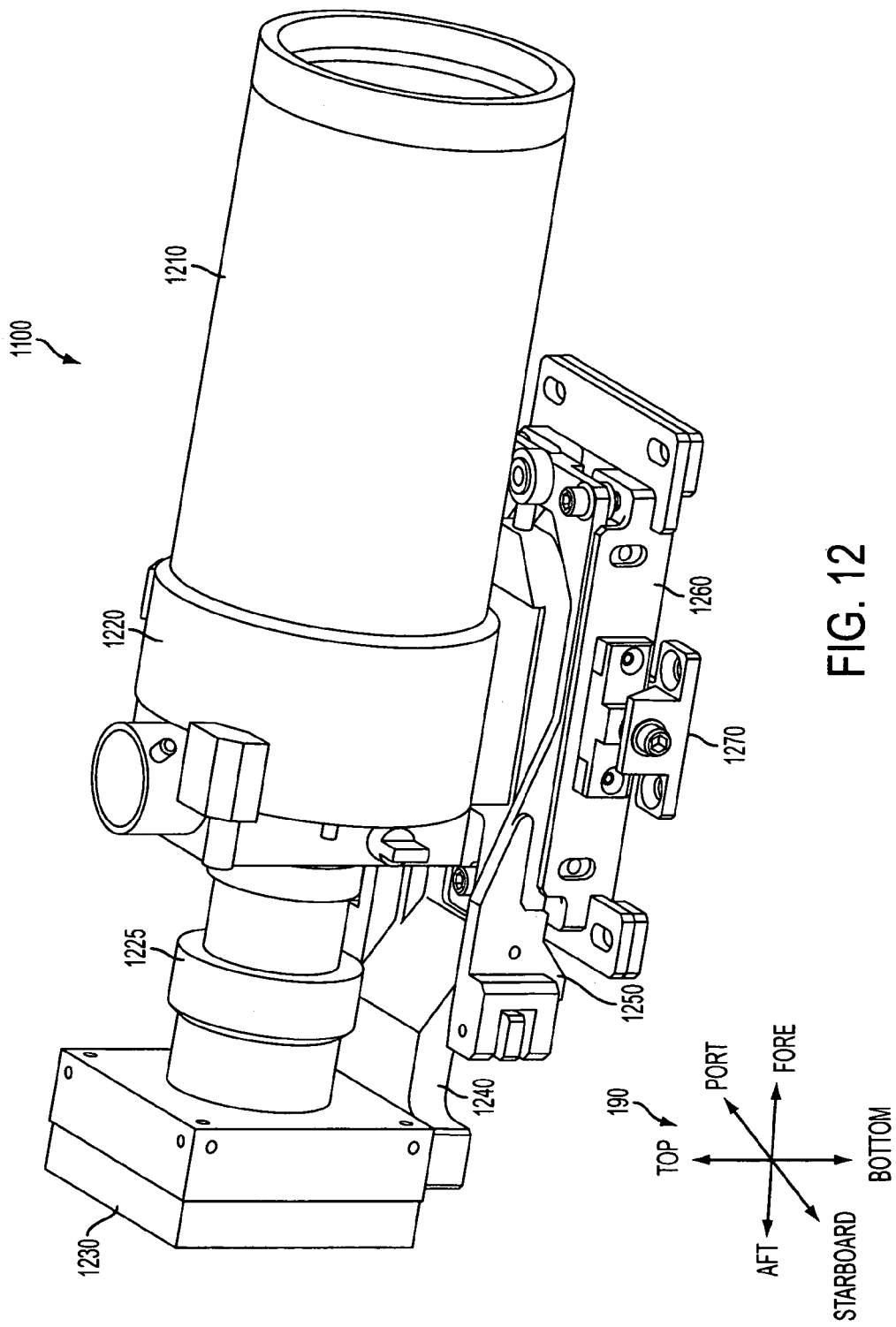
FIG. 12 is a perspective assembly view of an optical mount for a second embodiment.

FIG. 12 shows a perspective assembly view 1200 of a second embodiment of a compact rugged multi-axis optical mount in a second embodiment to reveal the starboard side. A telescope 1210, representing the optical element, can be cantilever-supported at its aft end by a cylindrical housing 1220, which connects via a cylindrical bracket 1225 to a camera block 1230. An upper support 1240 supports the housing 1220 and block 1230. A lower support 1250 supports the upper support 1240. A cradle 1260 connects the lower support 1250 to a base-mount 1270 for attachment to a platform.

Figure 13:
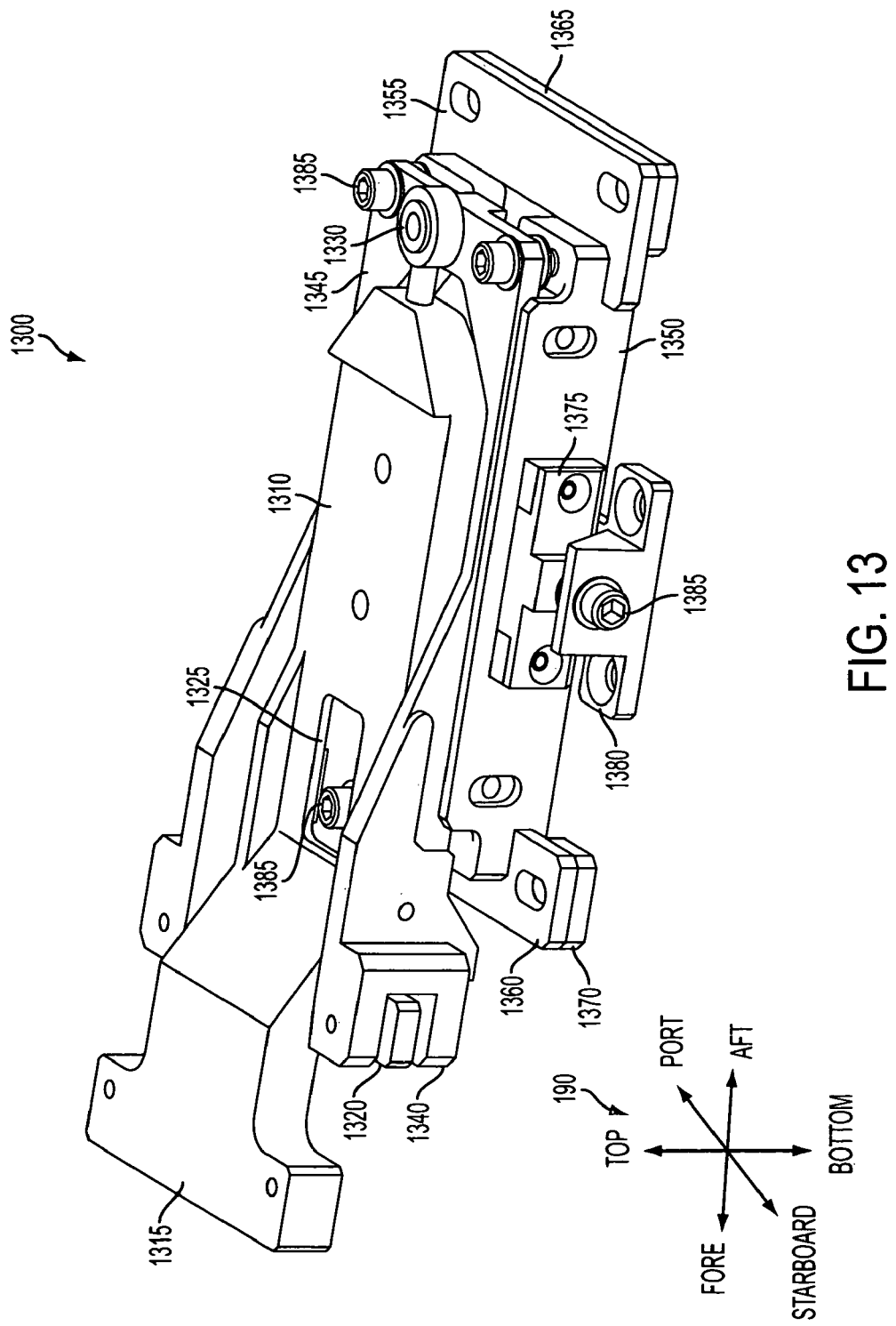
FIG. 13 is a first perspective view of a mount subassembly.

FIG. 13 shows a first perspective assembly view 1300 of the supports 1240, 1250, cradle 1260, and base-mount 1270. The upper support 1240 includes a fore tongue 1310 and an aft ledge 1315. The tongue 1310 and ledge 1315 connect together by an interface that includes a tang 1320 and a cavity 1325. A mount extension 1330 secures the tongue 1310 to the lower support 1250, which includes an aft groove 1340 to contain the ledge 1315 and a forward plate 1345 on which the extension 1330 attaches.

The cradle 1260 includes lateral walls 1350, a fore ledge 1355, and an aft ledge 1360. The base-mount 1270 includes a front pad 1365, a rear pad 1370, and lateral brackets 1375 adjacent the walls 1350 and onto which attach pivotable feet 1380 that flank the walls 1350. Screws 1385 secure the feet 1380 to their respective brackets 1375, as well as the forward plate 1345 to the fore ledge 1360. Two of the screws 1385 flank the extension 1330, and a third screw 1385 inserts through the orifice 1325.

Figure 14:
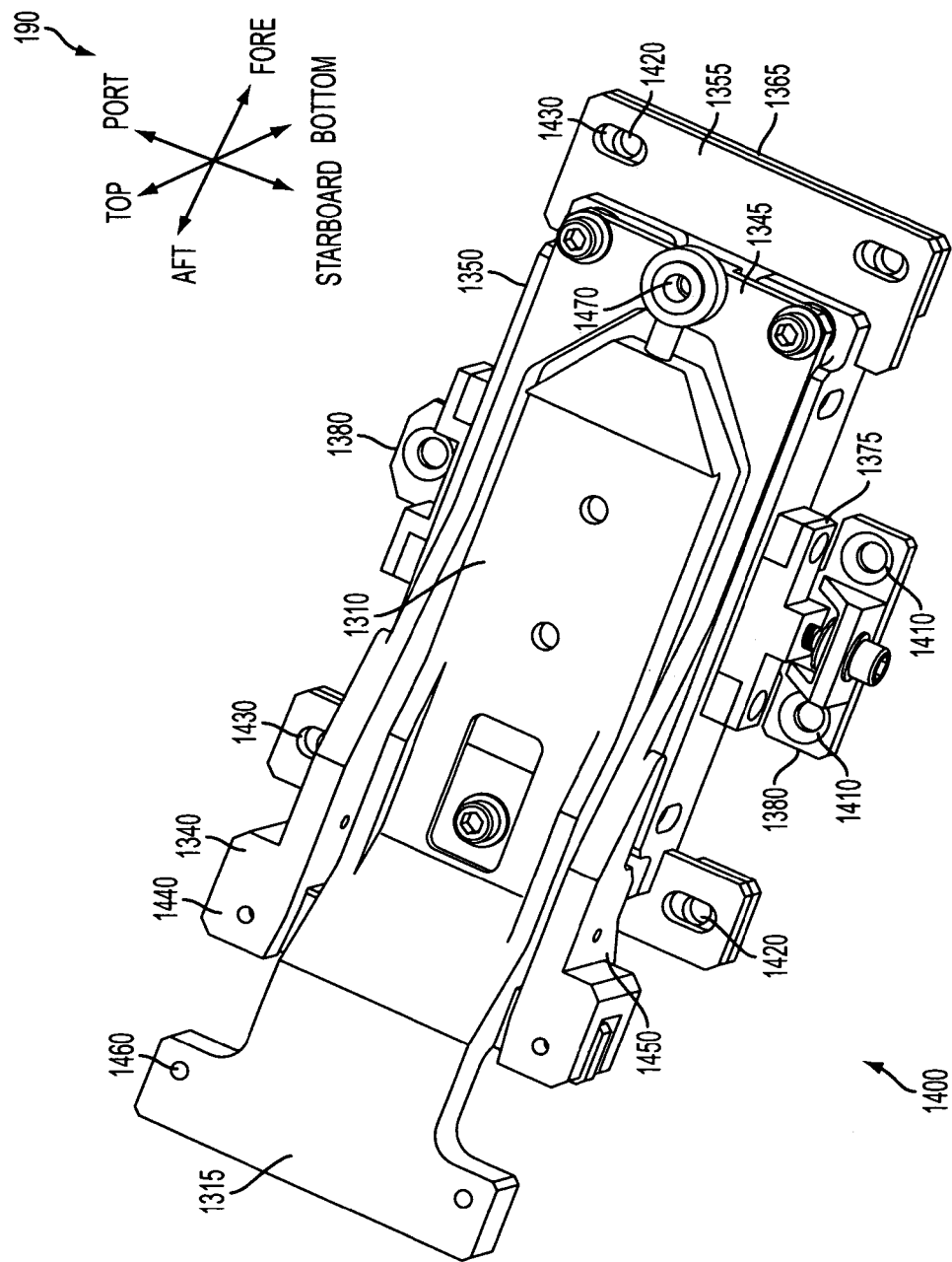
FIG. 14 is a second perspective view of the mount subassembly.

FIG. 14 shows a second perspective assembly view 1400 of the supports 1240, 1250, the cradle 1260 and the base-mount 1270 from the upper side. The feet 1380 include holes 1410 for mounting the base-mount 1270 to the platform. The front and rear pads 1365, 1370 also include horizontal-plane orifices 1420 for attaching the base-mount 1270 to the platform. The fore and aft ledges 1355, 1360 have horizontal slots 1430 that superimpose over their counterpart orifices 1420 to adjustably secure the cradle 1260 to the base-mount 1270. The slots 1430 enable adjustment of the cradle 1260 relative to the base-mount 1270 in lateral translation.

The groove 1340 includes horizontal-plane holes 1440 to restrict in pitch the aft portion of the lower support 1250 to the tang 1320 of the upper support 1240. The groove 1340 includes vertical-plane holes 1450 to secure in yaw the aft portion of the lower support 1260 to the tang 1320 of the upper support 1250. The ledge 1315 of the upper support 1240 includes horizontal-plane holes 1460 to secure the camera block 1230 thereto. The extension 1330 includes a horizontal-plane hole 1470 to connect the upper support 1240 to the lower support 1250. The holes 1450 enable yaw adjustment of the upper support 1250 in relation to the lower support 1260 from the extension 1330 as anchor. The mount assembly for this second described embodiment can incrementally pivot the optical element telescope 1210 around the longitudinal axis for limited roll adjustment, with translation in lateral and vertical directions.

Figure 15:
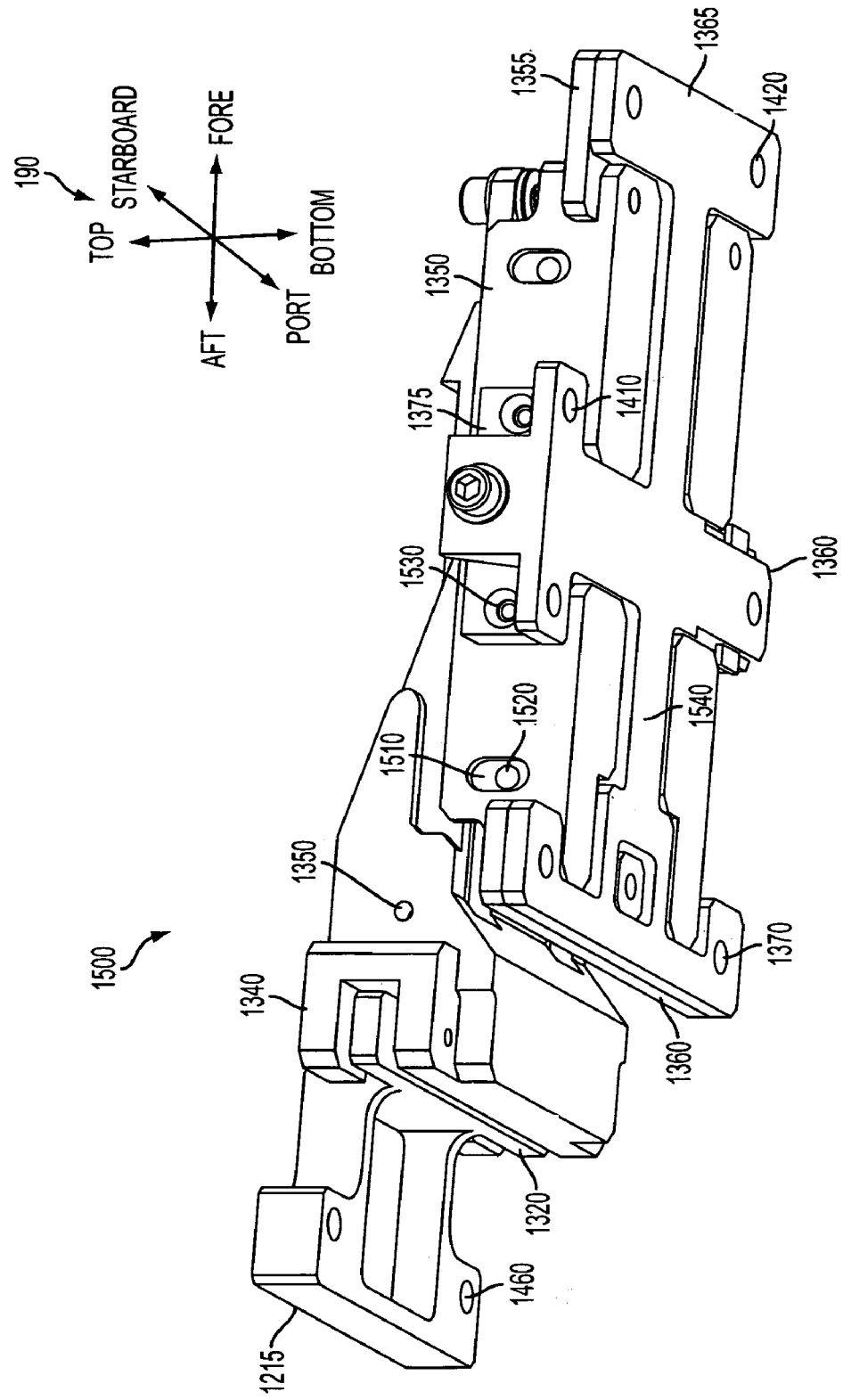
FIG. 15 is a third perspective view of the mount subassembly.

FIG. 15 shows a third perspective assembly view 1500 of the supports 1240, 1250, the cradle 1260 and the base-mount 1270 from the lower side. The walls 1350 include vertical slots 1510 adjacent the ledges 1255, 1260. The lower support 1250 includes counterpart orifices 1520 to receive corresponding screws to secure the lower support 1250 to the cradle 1260 adjustment available in vertical translation along the slots 1510. The brackets 1370 include holes 1530 to secure the feet 1360 to the walls 1350. The base-mount 1270 includes a longitudinal beam 1540 extending front to rear to connect together the pads 1365, 1370 and the feet 1360 together.

By these exemplary embodiments, the optical element can be securely mounted to a stationary platform, while enabling adjustment in translation and/or rotation in all Cartesian coordinates. These adjustments can be performed by fasteners, such as screws and/or bolts that pass through a pair of overlapping orifices, the outer orifice of which includes dimensions that permit modest movement prior to locking engagement.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A mount mechanism for aligning and securing an optical instrument to a platform, said mechanism comprising:
    a housing for receiving the optical instrument along a longitudinal axis, said housing including an attach support for the optical instrument, and an interface having a plurality of vertically-facing cylindrical-fastener orifices;
    a trunnion for supporting said housing at said interface, said trunnion having a plurality of vertical slots and a plurality of horizontal slots, wherein each vertical slot of said plurality of vertical slots overlaps a corresponding vertical orifice of said plurality of vertically-facing cylindrical-fastener orifices, said vertical slots provide elevation displacement to vertically translate and pitch said housing, said horizontal slots provide lateral displacement to horizontally translate and yaw said housing; and
    a base-plate for supporting said trunnion, said base-plate being mountable onto the platform, said base-plate having a plurality of horizontally-facing cylindrical-fastener orifices, wherein each horizontal slot of said plurality of horizontal slots on said trunnion overlaps a corresponding horizontal orifice of said plurality of horizontally-facing cylindrical-fastener orifices on said base-plate, and each orifice of said pluralities of vertically- and horizontally-facing orifices receives a cylindrical-fastener that passes through a counterpart slot of said pluralities of vertical and horizontal slots.

2. The mechanism according to claim 1, wherein said cylindrical fastener for said each orifice of said pluralities of orifices corresponds to a helical screw.

3. The mechanism according to claim 1, wherein said housing has a first end at which said attach support provides cantilever force and a second end opposite said first end having at least one housing screw for adjusting the optical instrument.

4. The mechanism according to claim 1, wherein
said housing includes first and second flanges that extend horizontally outward,
said trunnion includes third and fourth flanges that extend horizontally outward, said first and third flanges are substantially parallel to each other to mutually receive at least a first jack-screw, and said second and fourth flanges are substantially parallel to each other to mutually receive at least a second jack-screw.

5. The mechanism according to claim 4, wherein
said first jack-screw includes a first head and a first spring between said first head and said first flange to impose pre-load tension between said first and third flanges, and said second jack-screw includes a second head and a second spring between said second head and said second flange to impose pre-load tension between said second and fourth flanges.

6. The mechanism according to claim 4, wherein
said base-plate includes a cavity adjacent to a lateral member, said trunnion includes a fifth flange that extends vertically downward to be substantially parallel to said member of said base-plate, said member and said fifth flange are substantially parallel to each other to mutually receive a third jack-screw.

7. The mechanism according to claim 6, wherein
said first jack-screw includes a first head and a first spring between said first head and said first flange to impose pre-load tension between said first and third flanges, said second jack-screw includes a second head and a second spring between said second head and said second flange to impose pre-load tension between said second and fourth flanges, and said third jack-screw includes a third head and a third spring between said third head and said member to impose pre-load tension between said member and fifth flange.

8. The mechanism according to claim 1, wherein
said base-plate includes a plurality of base-vertical orifices for receiving platform fasteners to pass into the platform.

9. The mechanism according to claim 1, wherein
said housing is unitary.

10. The mechanism according to claim 1, wherein
said housing comprises a plurality of interfacing components.

* * * * *